Oct. 31, 1967    N. W. BELL    3,350,701
MEASURING CIRCUIT EMPLOYING OPPOSITELY VARYING VOLTAGE
DEPENDENT CAPACITIVE MEANS
Filed June 8, 1965    3 Sheets-Sheet 1

INVENTOR.
NORTON W BELL
BY
Christie, Parker & Hale
ATTORNEYS.

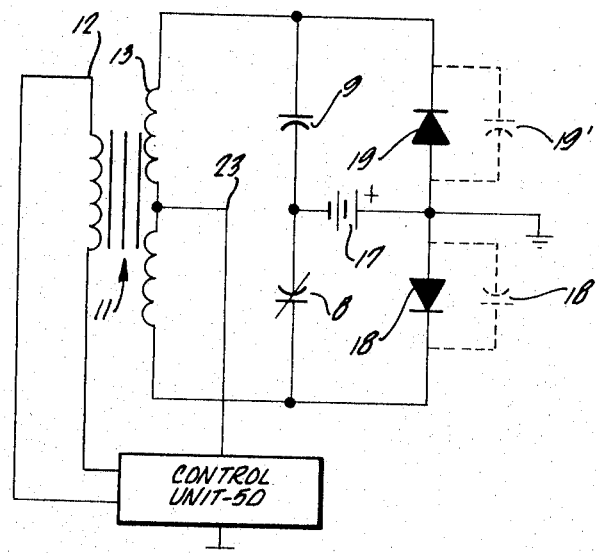
FIG_1A_
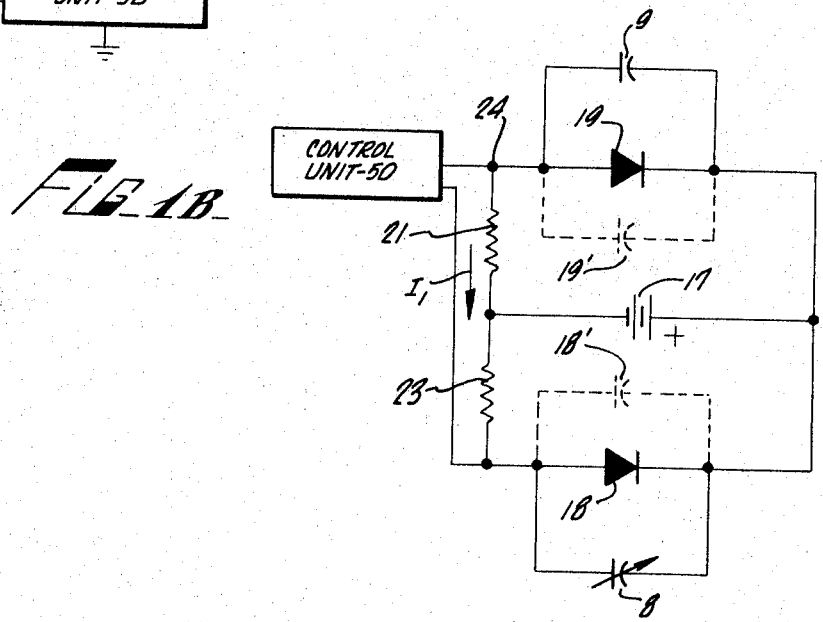
FIG_1B_
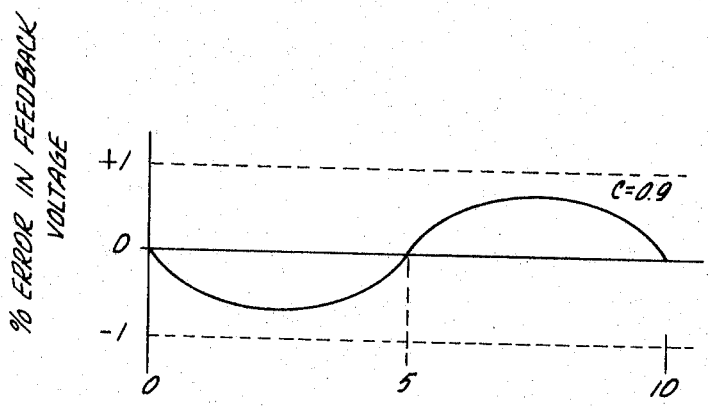
FIG_4_
INVENTOR.
NORTON W. BELL
BY
Christie, Parker & Hale
ATTORNEYS.

INVENTOR.
NORTON W. BELL

United States Patent Office 3,350,701
Patented Oct. 31, 1967

---

3,350,701
MEASURING CIRCUIT EMPLOYING OPPOSITELY VARYING VOLTAGE DEPENDENT CAPACITIVE MEANS
Norton W. Bell, Pasadena, Calif., assignor to Bell & Howell Company, Chicago, Ill., a corporation of Illinois
Filed June 8, 1965, Ser. No. 462,214
12 Claims. (Cl. 340—186)

This invention relates in general to measuring instruments and, more particularly, to a new and novel circuit configuration for measuring changes in parameter values at a remote location where conventional measuring equipment is not acceptable.

Conventional bridge circuits are well-known in the art and such bridge circuits have found extensive application in the past as measuring instruments in situations wherein manual adjustments of parameter values could easily be made in the arms of the bridge circuit. These manual adjustments sought to balance out any capacitance or reactive changes in the circuit elements to be measured, and thus such adjustments reflected the amount of change in the measured element. These manual adjustments, of course, require easy accessibility of the bridge circuit arms. Attempts to locate one part of a conventional bridge circuit at a test location and another part of the bridge circuit at a remote measurement control point have not been satisfactory. This prior art approach generally introduces a serious unbalanced condition in the bridge circuit which is temperature-sensitive in different degrees at both locations. These prior art circuits also include stray capacitances resulting from the connecting leads between the two points, which stray capacitance is not a stable value and thus cannot easily be compensated for. Accordingly, such prior art approaches cannot readily be balanced by conventional circuitry, and have proved ineffective in many measurement applications.

Efforts in the past have been made to eliminate the foregoing manual adjustments and to substitute in their place a circuit which would provide an electrical indication of changes in parameter values. These attempts in general have failed because such prior art approaches are not sensitive enough to register very slight changes in parameters and are highly critical to any changes in ambient temperature at the bridge circuit.

The above-mentioned disadvantages of the prior art are avoided by the measuring system of this invention which includes a new and novel circuit arrangement that is substantially insensitive to circuit parameters nonlinearities and provides an arrangement wherein the various temperature coefficients for the circuit parameters cancel out. The measuring system of this invention includes a bridge circuit which may be located at an inaccessible location and be connected to a control point which is remote from the bridge circuit by a circuit arrangement which avoids any adverse effect by stray capacity presented by the connecting leads between the control point and the remote location.

The measuring system of this invention comprises a bridge circuit having a fixed capacitor connected in parallel with a first voltage variable capacitance means in one bridge arm, and a capacitor whose capacitance changes are to measured connected in parallel with a second voltage variable capacitance means in a second arm of the bridge circuit. Source means biasing said first and second voltage variable capacitance means at equal capacitive values provide a normally balanced condition for the bridge circuit when the fixed and variable capacitors are equal in value. Any change in the capacitor to be measured unbalances the bridge circuit and a detecting means develops an output signal which is proportional to this unbalanced condition.

Associated with this detecting means, which is located at the control point, is a feedback voltage generator, also located at the control point, which generator responds to the output of the detecting means for applying a bridge rebalancing voltage in opposite polarity to each of the first and second voltage variable capacitance means. The voltage fed back to the bridge circuit to rebalance it is in the form of a relatively large DC output that is accurately proportional to very slight changes in the capacitance value which initially caused the unbalance. Accordingly, a direct reading voltmeter or indicating device monitors this DC signal and the reading of the indicating device indicates the magnitude of changes in the capacitor to be measured which readings are readily available at the control point.

The foregoing features and principles of this invention may more readily be understood by reference to the accompanying drawing in which:

FIG. 1 discloses the capacitance measuring system of this invention;

FIGS. 3 and 4 depict characteristics for an improved linear relationship between capacitance changes and the feedback voltage in accordance with an alternative embodiment of the principles of this invention.

Figure 1:
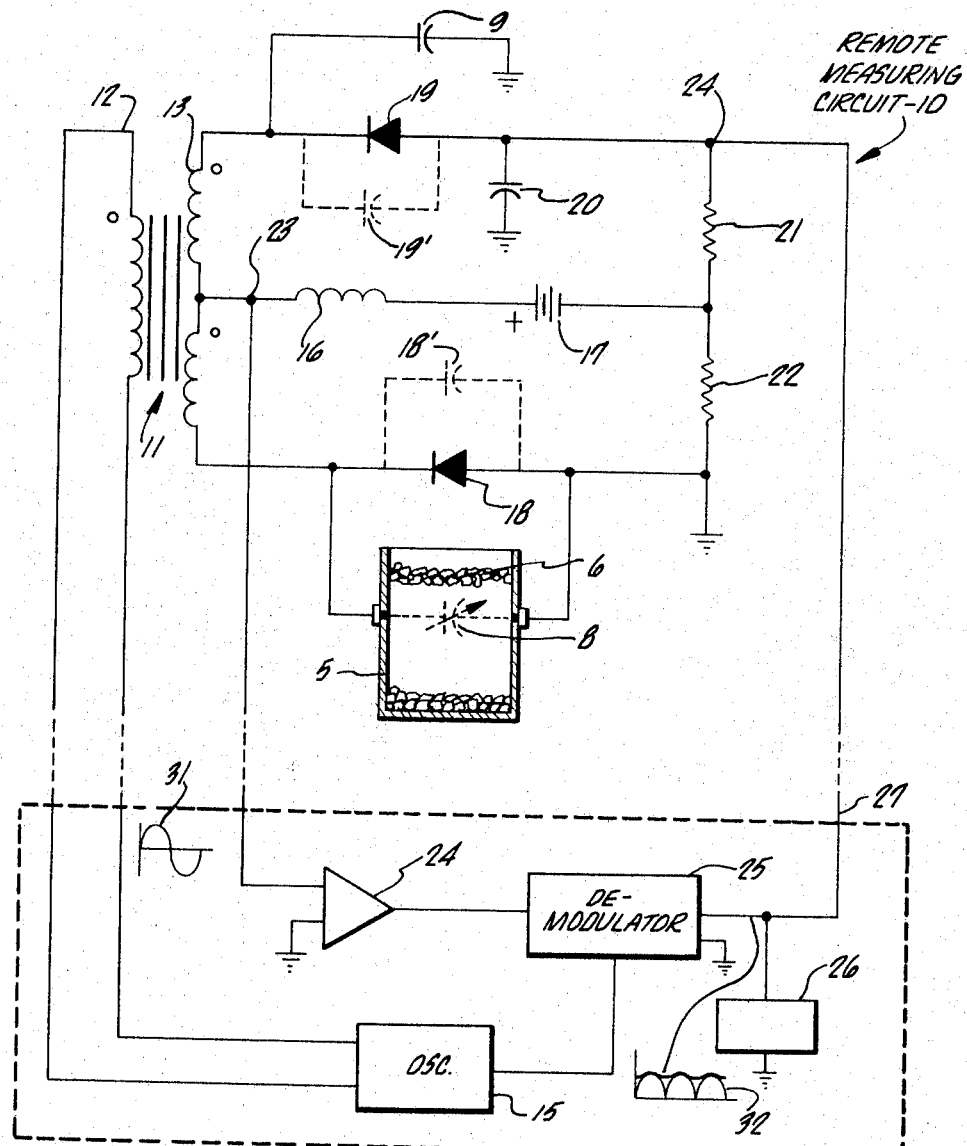
FIG. 1A is a circuit schematic useful in describing the alternating current balance in the bridge circuit of FIG. 1.
FIG. 1B is a circuit schematic useful in explaining the direct current balance for the bridge circuit of FIG. 1.

The capacitance measuring system of this invention is depicted in FIG. 1 as occupying two distinct locations. The measuring circuit 10 of this invention is remotely located from a centralized measuring control location 50. The remote location is depicted in FIG. 1 as in the vicinity of a storage bin 5 which may, for example, be many stories higher than the control location. In FIG. 1 the storage bin 5 may store solids having a variable water content which is to be measured. Such solids for example might take the form of wood chips, grain, etc.

The principles of this invention, of course, are not limited to the determination of the water content in solids, and numerous other uses will readily be apparent to those skilled in the art. A few of such other uses include measuring the proportions of mixtures of liquids having different dielectric constants, providing an indication of the end point of titration, gauging fluid levels such as gasoline, measuring thickness of dielectrics, etc. All of the foregoing uses, in general, exhibit a capacitance value that is proportional by a known relationship to the material being measured. For example, as shown in FIG. 1 with respect to measuring the water content of solid 6 in storage bin 5, the material to be measured is depicted as a dashed variable capacitor 8. Variations in the proportion of water and solid would change the value of capacitor 8. Any change in the capacitance value of capacitor 8 will appear as an accurately measurable voltage indication in the central control location 50 in accordance with the principles of this invention described in detail hereinafter.

Measuring circuit 10 at the remote location includes two separate arms. Connected in one bridge arm is a parallel circuit which includes capacitor 8 to be measured in parallel with a voltage-sensitive variable capacitive means such as a varactor diode 18. In a similar manner the other arm of the bridge circuit 10 includes a fixed capacitor 9 and another varactor diode 19. A by-pass capacitor 20 is connected between ground and the anode electrode of diode 19. This bypass capacitor 20 is chosen with respect to the bridge excitation frequency to present a short circuit to ground for high frequency alternating current signals.

Bridge excitation may be provided by a circuit which includes transformer 11, having a primary winding 12 and a tapped secondary winding 13. The primary winding 12 is connected by leads running to the control location and serves to excite the bridge at a high frequency alternating current signal which is provided by oscillator circuit 15 located at the control location. Secondary winding 13 has its end terminals connected as shown to the cathodes of both varactor diode 18 and varactor diode 19. The center-tap terminal of secondary 13 is connected to a high frequency choke coil 16, which in turn is series connected to bias source 17.

Bias source 17 is chosen to apply a reverse bias across the varactor diodes 18 and 19, in the closed loop paths formed by its connection to the potential divider resistors 21 and 22. It is well known that certain semiconductor diode elements when back biased provide a small signal capacitive reactance dependent upon the reverse bias applied across the element. See the article by L. J. Giacoletto and J. H. O'Connell entitled "Variable-Capacitance Germanium Diode for UHF," RCA Review, March 1956. The potential bias source 17 which establishes this reverse bias may be a battery or any other source of potential that is isolated from a ground potential.

If the capacitive value of capacitor 9 is equal to the capacitive value of capacitor 8 in the circuit of FIG. 1 and if source 17 has biased both varactor diodes 18 and 19 at equal capacitance values, the measuring circuit arms are balanced and there is no output signal developed at monitoring connection 23. An amplifier 24 at the control location, is connected to monitoring point 23 for determining unbalanced conditions in the bridge. For example, if it is assumed that the water content in the solid 6 located in bin 5 were to change in a manner such that the capacitance value of capacitor 8 decreased, the bridge circuit would be unbalanced and an alternating current signal indicating this unbalanced condition would appear at connection 23 where it is an input signal for amplifier 24. Output signals from amplifier 24 are applied to a synchronous demodulator 25 of any well known type. A change in capacitor 8 will produce a signal 31 at the input of amplifier 24. Signal 31 after demodulation will appear substantially as a direct current output signal 32. The polarity of the output will depend upon whether the capacity increased or decreased. The amount of the output signal will be proportional to the amount of capacity change. This direct current output signal 32 is monitored by a voltage measuring indicating device 26. Readings on device 26 indicate the amount and direction of capacitance change of capacitor 8.

The DC output voltage 32 is applied by lead 27 to the potential divider resistance 21 and 22 at the remote measuring circuit 10. This voltage is applied to the two varactor diodes 18 and 19 in opposite polarity and serves to automatically rebalance the bridge circuit. Operating in this fashion the diodes change capacity in opposite directions and their individual nonlinear voltage capacitor characteristics shown in FIG. 2 tend to cancel each other out, with the result that a linear relationship is established between the output voltage 32 and the capacitance values of varactor diodes 18, 19.

Figure 2:
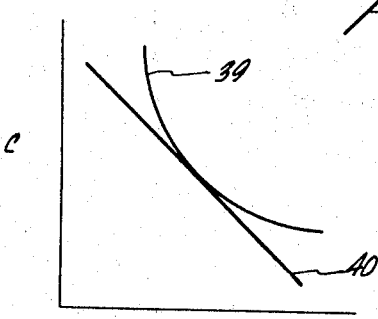
FIG. 2 is a capacitance voltage characteristic of the voltage-sensitive variable capacitance means of this invention.

In FIG. 2 the nonlinear characteristics for both diodes are essentially identical. The diode nonlinearity is shown graphically by characteristic 39 of FIG. 2. It will be discussed in detail following a brief analysis of the AC and DC circuit balance shown respectively in FIGS. 1A and 1B.

In FIG. 1A the control and measurement location 50 is merely shown in block form. Identical components in the figures are referenced by the same numbers in all figures. Thus, transformer 11 having primary winding 12 and secondary winding 13 is repeated in FIG. 1A. The circuit of FIG. 1A represents a balanced alternating current equivalent for the remote measuring circuit 10 of FIG. 1. Certain components of FIG. 1 are eliminated from FIG. 1A. For example, the high frequency choke coil 16 is essentially infinite impedance to the high frequency bridge excitation signal from oscillator 15 and thus it is not shown in FIG. 1A. The fixed capacitor 9 is connected in parallel with the varactor diode 19 of FIG. 1 which diode, when reverse biased exhibits a capacitive reactance for small signals. This capacitive reactance is represented in FIG. 1A by the dashed capacitors 19'. In a similar manner varactor diode 18 is connected in parallel across the variable capacitor 8 of FIG. 1. This varactor diode 18 is also reverse biased and has a capacitive reactance represented by 18', shown by the dashed lines in FIG. 1A. It is obvious that when capacitor 9 and the capacitive reactance 19' of varactor diode 19 are equal to the capacitor 8 and its parallel connected varactor diode capacitor reactance 18', the circuit arms are in alternating current balance assuming that winding 13 is a center-tapped secondary. When balanced in this manner there is not any signal developed at the monitoring point 23.

FIG. 1B represents a balanced direct current equivalent circuit for measuring circuit 10 of FIG. 1. Those circuit elements of FIG. 1 which are essentially short circuits for DC current are not shown in FIG. 1 and thus transformer 13 and the high frequency choke 16 are eliminated from the circuit of FIG. 1B.

In FIG. 1B the potential divider resistors 21 and 22 are series connected to ground for completing a single current path for the rebalancing signal from control unit 14. Control unit 14 as described in connection with FIG. 1 is responsive to any capacitance change which is to be measured for providing a direct current voltage at junction 24 of the potential divider resistor 21 and diode 19. It will be apparent that this voltage provides current $I_1$ through both portions of the potential divider. This current $I_1$ normally will be in a range of milliamperes. If the bias current for the varactor diodes which is normally in the microampere region is assumed negligible, the following basic equations describe the circuit of FIG. 1B:

(1) $\quad V_{C19'} = V_{17} + I_1 R_{21}$
(2) $\quad V_{C18'} = V_{17} - I_1 R_{22}$ The subscripts in the equations relate to the circuit component of FIG. 1 through FIG. 1B.

When the demodulator circuit 25 produces a positive voltage as a result of a decrease in capacitance value for capacitor 8, this positive feedback signal 32, FIG. 1, decreases the voltage $V_{C19'}$ across the varactor diode 19 and simultaneously increases the voltage $V_{C18'}$ across varactor diode 18. The greater voltage present across varactor diode 18 causes the width of the charge depletion region in the semiconductor to be broadened. Consequently its small signal capacity will decrease. Simultaneously the voltage across varactor diode 19 decreases and its capacity increases. When the resultant total change in capacities for both varactor diodes 18 and 19 equals the amount that the capacity of the capacitor 8 is decreased, the circuit will again assume an AC balanced condition. At this time there will be no further change in the output signal indicative of an unbalanced condition appearing at junction 23 as monitored by amplifier 24 of FIG. 1. If the amplification provided by amplifier 24 is very great, only an infinitesimally small input signal will provide the output voltage needed to approximately re-balance the circuit. Since this re-balance operation causes the diodes to change capacity in opposite directions their nonlinearities in capacitance-voltage characteristics tend to cancel out and make the DC output signal produced by the demodualtor circiut 25 accurately proportional to the change in capacitance which is being measured.

It should be understood that the foregoing principles of this invention are not limited to a variable capacitance operation at capacitor 8, but include the alternative of presenting a fixed capacitance for the second bridge arm and a variable capacitance for the first bridge arm.

A third alternative which is equally within the principles of this invention is to arrange the circuit in such a manner that both the capacitor 8 and the capacitor 9 are variable as they would be if the circuit were used as a three-plate displacement transducer. In this particular operation any change in one capacitor is equally in an opposite direction in the remaining capacitor and therefore, the output voltage by the feedback loop including demodulator 25 is twice the value it would have if only one capacitor changed. Further, this invention is not limited to the use of tapper-transformer bridge circuits. Other types of bridge circuits are known to those skilled in the art.

As mentioned hereinbefore, an analytical expression may be developed which relates any fractional change in the capacity, such as that in capacitor 8, to the fractional change in feedback voltage which is required from demodulator 25 to re-balance the measuring circuit 10, FIG. 1. These analytical expressions may be defined in terms of equations which, if the turns ratio between the two halves of secondary 13 of the excitation transformer 11 are equal, represent a balance when:

(3) $\quad C_8 + C_{18'} = C_9 + C_{19'}$

The capacity of the varactor diodes, shown dashed as $C_{19}$ and $C_{12}$, as is well known, is proportional to $V^{-n}$. The value of n is usually between 0.3 and 0.5 depending upon whether a gradual or an abrupt type of junction is present in the varactor diodes 18 and 19. Assuming that varactor types such as Hughes 1N950 are used, $n$ is approximately 0.5. If the bridge is thereafter caused to assume an unbalanced condition by capacitor 8 increasing an amount $C_8(1+r)$, where $r$ is a fractional change in capacitance value; and if $R_{21}$ is equal to $R_{22}$, then after the demodulator 25 voltage re-balances the circuit by altering the voltages across the diodes 18 and 19 by a fraction $(1+a)$, where $a$ is the fractional voltage change, then assuming $n=0.5$ the balance equations may be written as:

(4) $\quad C_8(1+r) + C_{18'}/\sqrt{1+a} = C_9 + C_{19'}/\sqrt{1-a}$

If the radical is expanded by the binomial theorem and fourth order terms and higher are neglected, Equation 4 may be solved as follows:

(5) $\quad r \cong \dfrac{C_{18'}}{C_8}\left[a + \dfrac{15}{24}a^3\right]$

Ideally the fractional change in diode voltage should be linearly related to the fractional change in capacitance. Equation 5 shows that a 30 percent change in diode voltage $(a=0.3)$ will correspond to a 31.7 percent $(r=0.317)$ change in capacity assuming the bridge to be perfectly balanced. The nonlinearity error in this example is about 5 percent.

I have discovered that a significant improvement in linearity is possible when measuring an increase in capacitor $C_8$ if $R_{21}$ is chosen greater in value than $R_{22}$ by an amount defined as:

(6) $\quad R_{21} = R_{22}(1+c)$ where $c$ may be determined analytically or experimentally. In accordance with this alternate embodiment a larger portion of the feedback voltage 32 appearing at junction 24 appears across resistor 21, and thus a greater capacitance change exists for varactor diode 19.

Figure 3:
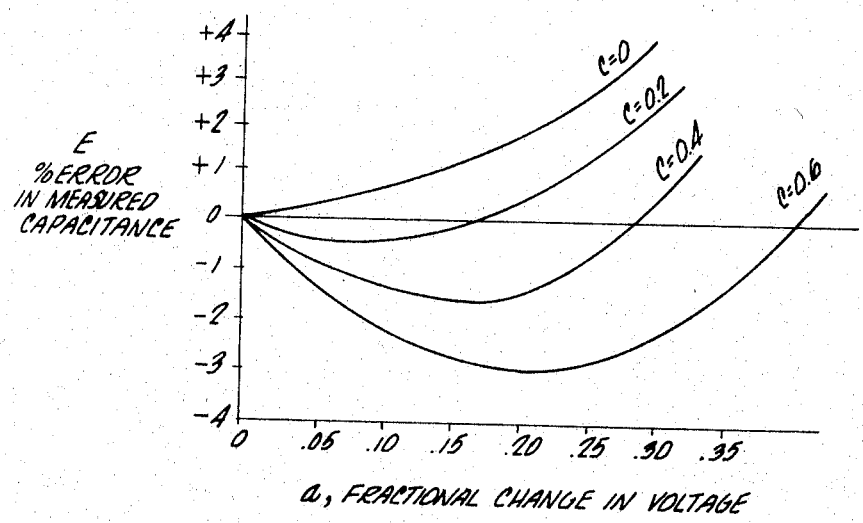

When the potential divider resistors 21, 22 are chosen in this fashion the fractional change in feedback voltage applied to diode 19 necessary to restore balance may be expressed as a $(1+c)$. The fractional change in voltage applied to diode 18 is a $(1-c)$ where the values are substituted in Equation 4 above, and the radical is expanded (again assuming $n=0.5$) and insignificant higher ordered terms are neglected. Under such conditions an approximate expression for fractional errors E, in measured capacitances as a function of fractional changes in diode voltage $a$ is as follows:

(7) $\quad E = a\left[\dfrac{15}{24}a\left(1+\dfrac{3}{2}c\right) - \dfrac{3}{4}c\right]\Big/(1+c/2)$ Equation 7 is plotted in FIG. 3. Note that a smaller value of error E may be maintained over a large range of capacitance changes when the resistors are not equal.

In the above-mentioned analysis the diode exponent $n$ has been assumed to be 0.5. With actual diodes the exponent may change as the applied voltage changes. Therefore, the analysis is slightly in error.

FIG. 4 shows the measured performance of the circuit of FIG. 1 at a frequency of one megacycle. The following component values were used:

| | |
|---|---|
| Diodes 18 and 19 | 1 |
| Winding 12, μh. | 12 |
| Winding 13 (equal portions), μh. | 130 |
| Choke 16, mh. | 1 |
| Capacitor 20, mf. | .1 |
| Resistor 21, kilohms | 1.9 |
| Resistor 22, kilohms | 1 |
| Capacitors 8 and 9 (balanced), pf. | 80 |

[1] Hughes 1N950.

No detailed mathematical analysis on the improved cancellation of temperature coefficients for the varactor diode is believed to be required. Suffice it to state that by employing the new and novel circuit configuration of this invention temperature sensitivity for the varactor diodes tends to cancel out. Experimental results have shown, for example, off-the-shelf components for varactor diodes 18 and 19 have temperature coefficients similar to within 30% of one another. With such diodes measurement errors for temperature ranges approximately 25° centigrade to 60° centigrade represent an average capacitance change of 0.1 picofarad. Experimental results have proved that under such conditions the measurement error of the circuit of FIG. 1 resulting from temperature sensitivity is approximately 0.03 pf.

Figure 5:
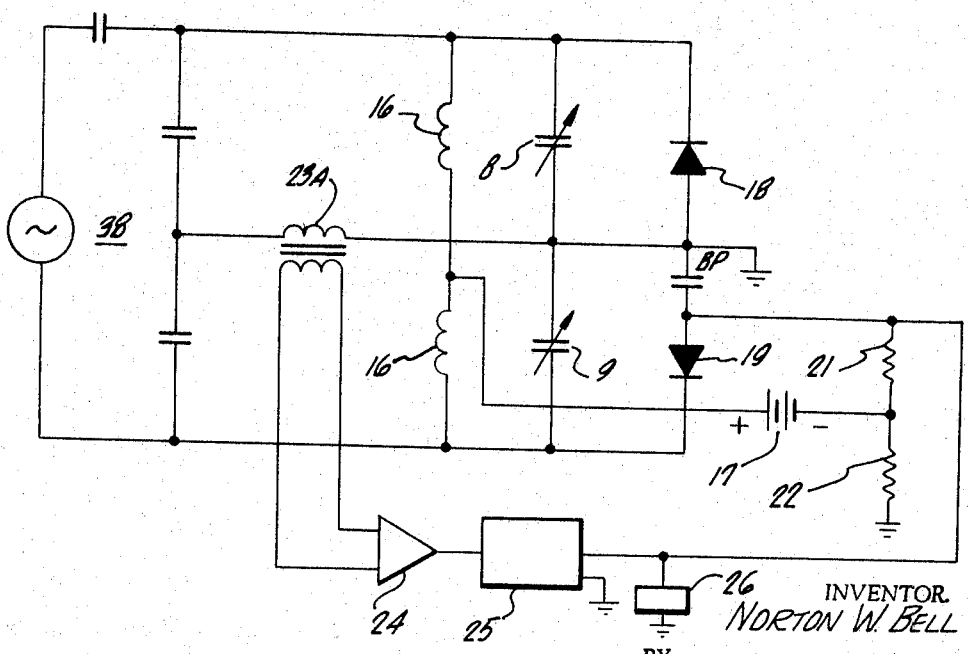
FIG. 5 depicts an alternative circuit arrangement embodying the principles of this invention.

FIG. 5 depicts an additional embodiment employing the principles of this invention. The measuring circuit of FIG. 5 utilizes conventional coupling wherein the transformer 11 of FIG. 1 is replaced by a capacitive input and excitation circuit 38. Output signals for amplifier 24 are inductively coupled to it by a monitoring coil 23A. The operation for the circuit of FIG. 5 is similar to that of FIG. 1 and need not be described in detail.

The foregoing, in summary, discloses that by employing a pair of varactor diodes connected in the manner described, any change in capacitance to be measured may be accurately represented by a DC output voltage level that is fed back to the diodes in oppositive polarity so that an immediate automatic rebalance is achieved.

It is to be understood that the foregoing features and principles of this invention are merely descriptive, and that many departures and variations thereof are possible by those skilled in the art, without departing from the spirit and scope of this invention.

What is claimed is:

1. A measuring system comprising a bridge circuit having first and second arms, each arm comprising a capacitive element connected in parallel across a voltage sensitive variable capacitance means, a transformer winding having first and second end terminals and a center-tap terminal, means connecting the first terminal of said winding to one side of the parallel circuit of said first bridge arm and means connecting the second end terminal of said winding to one side of the parallel circuit of said second bridge arm, a potential divider comprising first and second resistance means connected in series to ground, means connecting the first resistance means to the remaining side of the parallel circuit in said second arm to ground, a bias source connected between said center-tap and the junction formed by the series connected first and second resistance means, said bias source poled to complete a path for reverse biasing said variable capacitive means at normally equal capacitive values, a source of bridge excitation and inductively coupled to said transformer winding, means connected to the center-tap of said winding for detecting a signal indicative of a capacitive change in either of said capacitive elements, and voltage feedback means connected between said signal detecting means and the ungrounded end of said potential divider for oppositely varying the voltage across said variable capacitance means until said bridge circuit is rebalanced.

2. A measuring system in accordance with claim 1 and further comprising a voltage measuring device connected to said voltage generating means for indicating values of capacitances change in said measured capacitor.

3. A measuring system as defined in claim 2 wherein said first and second resistance means are equal valued.

4. A measuring system as defined in claim 2 wherein said first resistance means is chosen to have a larger value than said second resistance means to improve the linearity between said indicated values and actual capacitive value changes in said measured capacitor.

5. A measuring system comprising first and second voltage sensitive variable capacitive means, a bridge circuit having a fixed capacitor connected in a first parallel circuit with said first voltage variable means and a capacitor whose capacitance changes are to be measured connected in a second parallel circuit with said second voltage variable means, a bias source, means connecting one side of said first and said second parallel circuits in common to said bias source, resistance means connected between said bias source and the remaining side of said first and said second parallel circuits to complete bias current paths for biasing both of said voltage variable means, means connected to said common connecting means for detecting an unbalanced condition in said bridge when said capacitor to be measured changes in value, a voltage generating device connected between said detecting means and said resistance means for applying a bridge rebalancing voltage in opposite polarity to said first and second voltage variable capacitance means, and an indicating device scaled to record said generated voltage as a direct reading of capacity changes in said measured capacitor.

6. A measuring system in accordance with claim 5 wherein said means connecting said parallel circuits in common comprises; a transformer having a primary winding inductively coupled to a center-tapped secondary winding with two end terminals, one end terminal being connected to said one side of said first parallel circuit and the other end terminal being connected to one side of said second parallel circuit, an inductor connected between the center-tap of said secondary winding and said bias source; said measuring system further comprising a source of alternating current connected to said primary for supplying excitation energy to said bridge circuit.

7. A measuring system in accordance with claim 6 wherein said first and second voltage variable means each comprise a varactor diode having an anode and a cathode, said diodes poled to connect said cathodes one each to one end terminal of said secondary and poled to connect said anodes to said resistance means.

8. A measuring system in accordance with claim 7 wherein said detecting means is connected at a monitoring point between said inductor and said center-tap of said secondary winding, said detecting means comprising an amplifier responsive to alternating current signals developed at said monitoring point for developing an amplified output indicative of an unbalanced condition in said bridge circuit when said capacitor to be measured changes in capacitance value.

9. A measuring system as defined in claim 8 wherein said voltage generating means comprises a synchronous demodulator having an input connected to said amplifier for receiving said amplified signals and a control lead connected to said source of alternating current for developing a direct current output voltage which is linearly proportional to changes in capacitance values in said capacitor to be measured.

10. A measuring system in accordance with claim 9 wherein said bridge circuit is located at a substantially inaccessible location and said alternating current source, said amplifier, said demodulator, and said indicating device are located at a common control point remotely located from said bridge circuit location.

11. A measuring system substantially insensitive to circuit parameter nonlinearities and circuit parameter temperature coefficients comprising first and second voltage sensitive variable capacitive means each having nonlinear voltage-capacity characteristics, a bridge circuit having a fixed capacitor connected in parallel with said first voltage variable capacitance means in one of said bridge arms and a capacitor whose capacitance changes are to be measured connected in parallel with said second voltage variable capacitance means in the other one of said bridge arms, source means biasing said first and second voltage variable capacitance means at equal capacitive values for normally balancing said bridge circuit, detecting means connected to said first and second bridge arms for developing an output signal proportional to an unbalanced condition resulting from a change in capacitance value in said capacitor to be measured, voltage generating means, and means connected between said detecting means and said first and second bridge arms and including said voltage generating means for applying a bridge rebalancing voltage in opposite polarity to each of said first and second variable capacitance means.

12. A measuring system in accordance with claim 11 wherein said first and second voltage sensitive variable capacitive means comprise varactor diodes each having an anode and a cathode, said cathodes being connected in common to said signal detecting means and said anodes being connected in common to said bridge rebalancing voltage applying means.

No references cited.

NEIL C. READ, *Primary Examiner.*

THOMAS B. HABECKER, *Examiner.*